United States Patent [19]
Hobbs et al.

[11] Patent Number: 5,908,586
[45] Date of Patent: Jun. 1, 1999

[54] METHOD FOR ADDRESSING WAVEFRONT ABERRATIONS IN AN OPTICAL SYSTEM

[75] Inventors: Philip Charles Danby Hobbs, Briarcliff Manor; Theodore G. van Kessel, Millbrook, both of N.Y.

[73] Assignee: International Business Machines Corporation, Armonk, N.Y.

[21] Appl. No.: 08/918,364

[22] Filed: Aug. 26, 1997

[51] Int. Cl.⁶ .................................................. B29D 11/00
[52] U.S. Cl. ............................ 264/1.36; 264/1.7; 264/2.7
[58] Field of Search .............................. 264/1.1, 1.7, 1.9, 264/2.7, 1.36

[56] References Cited

U.S. PATENT DOCUMENTS 3,922,327 11/1975 Howden .
4,902,100 2/1990 Reynolds et al. .

FOREIGN PATENT DOCUMENTS 2355091 5/1974 Germany .................................. 264/2.7
57-105704 7/1982 Japan ........................................ 264/1.9

Primary Examiner—Mathieu D. Vargot
Attorney, Agent, or Firm—McGinn & Gibb, P.C.; Stephen C. Kaufman, Esq.

[57] ABSTRACT

Method for correcting aberrations of an optical system and solving the problem of tolerance buildup. The method posits a desired specification limit for each of at least one optical characteristic of an optical element, and requires embossing at least a portion of a surface of the optical element for bringing the or each optical characteristic within its corresponding specification limit.

20 Claims, 1 Drawing Sheet

METHOD FOR ADDRESSING WAVEFRONT ABERRATIONS IN AN OPTICAL SYSTEM

FIELD OF THE INVENTION

This invention relates to methodology for addressing wavefront aberrations in an optical system.

BACKGROUND OF THE INVENTION

An optical system may comprise a single element, for example, a lens, a mirror, or a prism, or a combination of such optical elements, arranged for obtaining a combined optical characteristic. A combined optical characteristic, in turn, references a notion of describing a deviation from a nominal specification of a wavefront phase of an output radiation of the optical element, when the optical system is excited by a specified input radiation source.

SUMMARY OF THE INVENTION

An indicia and goal of excellent optical system quality includes a capability for manufacturing optical systems of a requisite optical characteristic. It is often specified, moreover, that this capability should not be compromised by cost, time, efficiencies, or fabrication considerations.

Our work addresses this situation by novel methodology, in comparison with prior art techniques. In prelude of defining our method, we first set in apposition various prior art techniques, to thereby highlight the novel and unobvious aspects of the present invention. In overview, we believe that the prior art techniques may be impractical, and this is because they attempt to solve a wrong problem.

The prior art acknowledges that optical elements such as lenses or prisms may derogate from a desired optical characteristic due to e.g., tolerance buildups. That is, the optical elements may have surface errors so that they deviate from the exact specified shape needed for their job. These surface errors, in turn, can be reduced by polishing them more carefully, but the costs increase very rapidly as the surface accuracy specifications tighten. Accordingly, the desiderata specified above, namely fabrication cost and time considerations, may be seriously compromised.

This problem is exacerbated, therefore, when attention is turned to cost-constrained systems, which often need to use complex moulded plastic optical elements, glued or snapped together to make a final assembly. Note: manufacturing yield of the elements themselves is generally good, but tolerance buildup often leaves a (disadvantageous) choice between custom adjustment and over specification, since custom adjustment is labour-intensive and requires that a system be designed with expensive and delicate adjustment screws and adjustable mounts.

Less ambitious systems suffer as well from wavefront errors. For example, laser diode collimators, used in magneto-optic storage as well as a host of other applications, may suffer from residual coma, astigmatism, and spherical aberration caused by part-to-part variations in the diode lasers and the lenses themselves, as well as by minor misalignment of the optics.

It is known that the aberrations of an optical beam can often be corrected essentially perfectly by a custom-made corrector plate placed in the pupil of the optical system; this approach is used for example in Schmidt telescopes. However, it is now presently very expensive to generate such correctors; the only available methods employ holography and diamond-machined glass elements. Holography is unsuitable for wide use because it requires high temporal coherence of the light and a very stable optical setup, is very dispersive (like a diffraction grating), and has low efficiency and high scatter. Diamond turning requires a lot of time on a very expensive figure generator, and since the figure generator is basically a lathe, it is difficult to make parts which are not sections of a solid of revolution. Besides being expensive and inflexible, diamond turning produces parts which exhibit high scatter due to the tool marks.

This review of illustrative prior art case studies, can now provide us with a basis for critiquing it and making intelligible the above assertion that its impracticability arises in its attempt to solve the wrong problem. It also points the way to the novel method of the present invention.

The wrong problem centers on correcting aberrations of an optical system and tolerance buildup, by recourse to a figure generator or holographic setup. Now, a figure generator or holographic setup can make surfaces of high curvature (or the equivalent in a hologram), and in order to hold the high absolute accuracy required, the operation must be accurate to around a part in $10^{-6}$: however, this is an expensive and unnecessary process; hence, implicitly, the wrong problem.

The key observation, in contrast, is that the wavefront error of a reasonable optical system is at most 1–2 waves peak to peak over the full pupil, and is a smooth function. A system with a peak to peak error of 1/10 wave is essentially perfect for all practical purposes. Thus, the right problem to solve is how to make a corrector plate whose optical thickness varies by about a micron, and is accurate to 0.05 microns, peak to peak. This problem requires a dynamic range of only 20 or so, instead of $10^6$. Provided that the surface generated is smooth, the gentle curvature of the phase error surface requires many fewer adjustable parameters than might be supposed; in most cases, 100 points are more than sufficient to correct an 8 mm diameter field to the required accuracy.

The present invention methodology is responsive to the right problem, and can accordingly secure significant advantages as compared with the prior art. In brief, employment of the present method can correct the aberrations of an optical system, and solve the problem of tolerance buildup, without the prior art disadvantages and therefore without undue compromises of the type recited above as pertain to cost, efficiency, or time. Moreover, enablement of the present method is such that high performance optical systems can be fabricated (as compared to the prior art) with fewer elements, of much poorer quality, and with looser assembly tolerance, thereby resulting in large cost savings.

To this end, we disclose, in a first aspect, a method comprising the steps of:

1) defining a specification limit for each of at least one optical characteristic of an optical element; and
2) embossing at least a portion of a surface of the optical element for bringing the or each optical characteristic within its corresponding specification limit.

In a second aspect, the present invention comprises a method including the steps of:

1) providing an optical assembly, the assembly comprising first and second optical elements arranged for obtaining a combined optical characteristic; and
2) embossing a portion of at least one of the first and second optical elements for modifying the combined optical characteristic.

BRIEF DESCRIPTION OF THE DRAWING

The invention is illustrated in the accompanying drawing, in which.

DETAILED DESCRIPTION OF THE INVENTION

Figure 1:
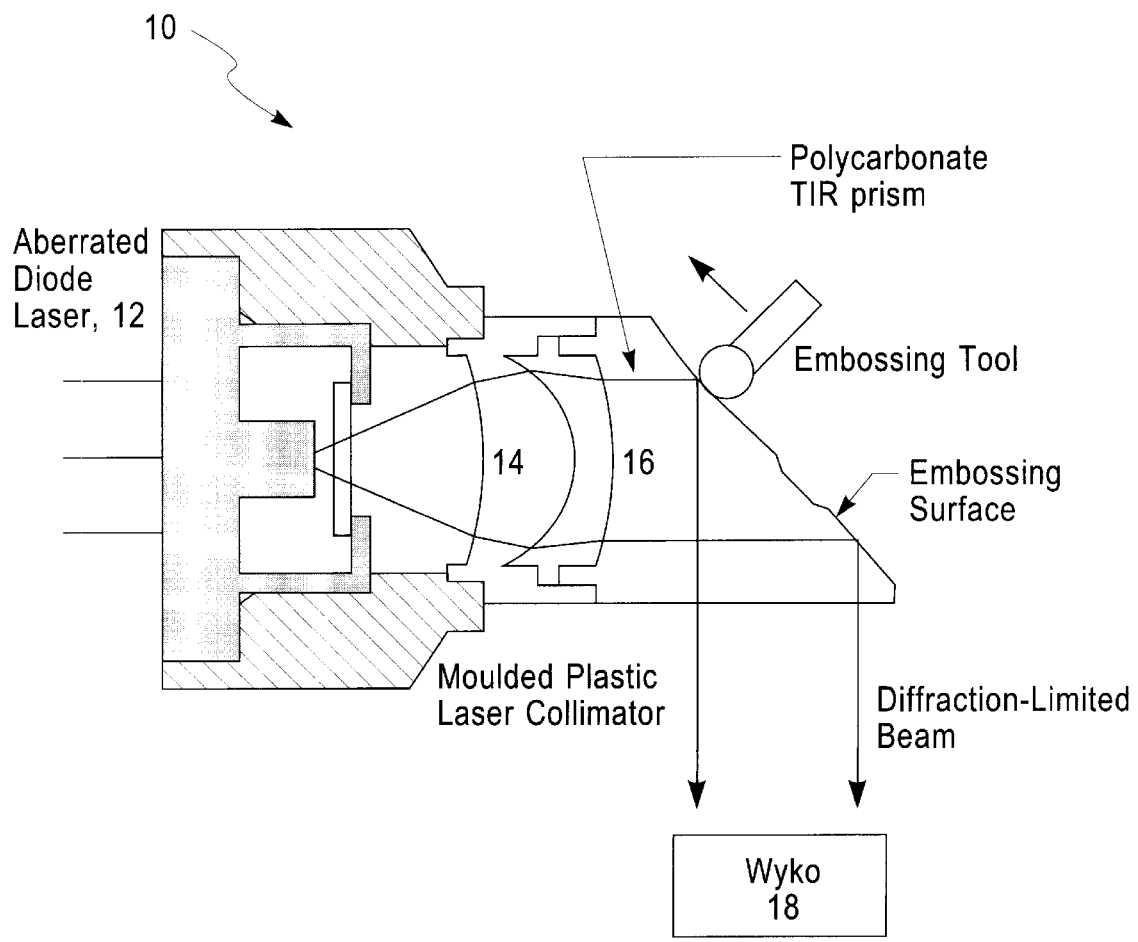
FIG. 1 shows an operation of an optical system in accordance with the method of the present invention.

This invention embodies a method for designing, generating, and verifying corrector plates, simply and quickly. A description of the system operation unfolds as three parts: a preferred fabrication of the corrector plate itself, a system schematic, and a preferred software algorithm.

Corrector Plate Fabrication

A corrector plate preferably comprising a flat plate with a slight wavy pattern in its surface, can be made in several ways. It can be made by ion-implanting gallium or sodium into quartz, as is done in integrated optical waveguides; by photolithographic techniques, as in binary optics; or, by using a direct-write system similar to an air brush to deposit dielectric material locally, any of which can be combined with the remainder of this invention to produce an optical corrector plate.

One can use a parallel technique rather than a scanning one, by using a deformable (e.g., piezoelectric) platen to force a thin plate into a predefined surface, after which it could be UV-epoxied to a strong flat plate (rather like gluing a cover slip to a microscope slide). The ion implantation method should be most helpful in the ultraviolet, where the transparency of quartz or sapphire is especially helpful. A preferred embodiment uses a curved burnishing tool (a glass sphere in this case) to emboss the surface of a piece of polycarbonate sheet.

The embossing may be done in two ways, which can be combined if necessary.

The first is to press the sphere into the surface, remove it, and go on to the next site. The depth of the depression depends on how much force is applied and for how long, the radius of the sphere, the thickness of the polycarbonate, the resilience of the backing material, and the previously written topography. When two pits are made close together, as is necessary to produce an arbitrary smooth shape, the formation of subsequent pits partially erases neighboring ones, so that in the design of the plate, it is necessary to include a model of this self-erasure to ensure that the final plate is correct. This pointwise method is suitable for correcting relatively strong, localized aberrations such as coma, for small local corrections of residual errors in a previously embossed plate, or for small production runs where speed is not important.

The other way is to plough furrows in the material, by pushing the sphere into the plastic as it moves along. This method simplifies the mathematics of synthesizing the embossing pattern from the optical prescription, since the self-erasure occurs only between neighboring furrows, not along the furrow. Some form of lubrication, such as alcohol or soapy water, is needed to ensure smooth sliding of the sphere along the surface, to prevent surface cracking and chatter marks. The ploughing can be done in a raster pattern or in a spiral, both of which have advantages, but which are essentially interchangeable.

System Operation

Preferred operation of a system is shown schematically in FIG. 1, numeral 10, which illustrates an application in diode laser collimators. A laser 12 which produces a highly divergent, significantly aberrated beam, is roughly collimated using an inexpensive ($3) replicated acrylic lens 14, typically producing an output with some small residual defocus (perhaps 0.5 wave), together with about 0.5 wave of spherical aberration due to the window in the laser package, 0.3 wave of coma due to misalignment of the laser and lens and 1 wave of astigmatism intrinsic to the laser itself. The total aberration is approximately 1.8 waves peak to peak, which represents a rather poorly collimated beam. This beam passes through a plastic plate 16 (antireflection-coated polycarbonate similar to inexpensive eyeglasses) which is glued to the collimator assembly, and into a measurement interferometer 18 such as a Wyko Ladite.

The interferometer 18 produces a data file which describes the phase aberration of the beam. This file is the input for a computer program (described below) which translates the wavefront error into a control file for an embossing machine. The control file contains a list of coordinates of points to move to, the force to be applied while traversing there, the speed at which to move, how long to stay there, and whether the stylus is to be raised or lowered on arrival or departure.

After embossing, the wavefront is reexamined using the interferometer 18, and any remaining corrections are added in a second embossing operation. Note that the embossing operation provides vernier action.

Experimental Results

We have verified the feasibility of generating surfaces with this technique using a simple, hand-operated version; it produced clean pits, and furrows which are a little wavy at the top due to the varying speed at which the micrometer on the translation stage was turned. We also have verified that overlapping pits and furrows can be used to produce more general shapes.

Other Extensions

Once the basic system is running, it can be extended to more general situations. It is not necessary that the corrector be a separate piece; the embossing can be done directly on a plastic or plastic-coated optical element (e.g., a lens element). Using two corrector plates with an air space or other lenses in between, it is possible to make a general amplitude and phase corrector, which could for example turn a poor quality beam from a neodymium-glass or multi-stripe diode laser into a circular Gaussian profile. By using two optical materials with different dispersion characteristics, it should be possible to make achromatic corrector plates.

What is claimed is:

1. A method comprising:
   1) providing an optical assembly, the assembly comprising first and second optical elements arranged for obtaining a combined optical characteristic; and
   2) embossing a portion of at least one of the first and second optical elements for modifying the combined optical characteristic, wherein the embossing provides vernier action.

2. A method according to claim 1, wherein said providing said optical assembly further comprises providing an input radiation source to the assembly.

3. A method according to claim 2, wherein a specification of the embossing is determined by measuring a characteristic of the output radiation of the assembly.

4. A method comprising:
   1) defining a specification limit for each of at least one optical characteristic of an optical element; and
   2) embossing at least a portion of a surface of the optical element for bringing said at least one optical characteristic within its corresponding specification limit, wherein the embossing provides vernier action.

5. A method according to claim 4, wherein said at least one optical characteristic describes a deviation from a nominal specification of a wavefront phase of an output radiation of the optical element, when the optical element is excited by a specified input radiation source.

6. A method according to claim 4, wherein the optical element comprises at least one of a lens, a mirror, a window, and a prism.

7. A method according to claim 4, wherein the optical element contains a deformable portion.

8. A method according to claim 7, wherein the deformable portion comprises a plastic.

9. The method according to claim 1, further comprising controlling the embossing by generating a data file which describes the phase aberration of an input radiation beam to the optical assembly as determined from an output radiation beam.

10. The method according to claim 9, further comprising using the data file as a control file for an embosser for performing said embossing.

11. The method according to claim 1, wherein said embossing is performed by an embosser, wherein said embossing comprises pressing the embosser into the surface of said at least one of said first and second optical elements, removing the embosser from the surface, and proceeding to a next site on said surface of said at least one of said first and second optical elements.

12. The method according to claim 11, wherein said embosser comprises a curved glass sphere.

13. The method according to claim 1, wherein said embossing is performed by an embosser, wherein said embossing comprises forming a furrow in a surface of said at least one of said first and second optical elements by pushing the embosser into the surface of said at least one of said first and second optical elements as the embosser is moved along the surface.

14. The method according to claim 13, wherein said embossing further comprises using a lubricant for smoothly sliding said embosser along said surface.

15. The method according to claim 13, wherein said forming said furrow is performed in one of a raster pattern and in a spiral pattern.

16. The method according to claim 4, further comprising controlling the embossing by generating a data file which describes the phase aberration of an input radiation beam to said at least one of said first and second optical elements as determined from an output radiation beam.

17. The method according to claim 16, further comprising using the data file as a control file for an embosser.

18. The method according to claim 11, wherein said embossing is performed by an embosser, and wherein said embossing comprises:

pressing the embosser into the surface of said at least one of said first and second optical elements, removing the embosser from the surface, and proceeding to a next site on said surface of said at least one of said first and second optical elements.

19. The method according to claim 11, wherein said embossing is performed by an embosser, and wherein said embossing comprises:

forming a furrow in the surface of said at least one of said first and second optical elements by pushing the embosser into the surface of said optical element as the embosser is moved along the surface of said at least one of said first and second optical elements.

20. The method according to claim 19, wherein said embossing further comprising using a lubricant for smoothly sliding said embosser along said surface, and wherein said forming said furrow is performed in one of a raster pattern and a spiral pattern.

* * * * *